July 15, 1952 M. L. THOMPSON 2,603,723

HIGH-FREQUENCY AMPLIFIER CIRCUIT

Filed June 3, 1947

INVENTOR
MILTON L. THOMPSON
BY
Ostrolenk and Faber
ATTORNEYS

UNITED STATES PATENT OFFICE 2,603,723

HIGH-FREQUENCY AMPLIFIER CIRCUIT

Milton L. Thompson, Huntingdon Valley, Pa., assignor to Philco Corporation, a corporation of Pennsylvania Application June 3, 1947, Serial No. 752,134

7 Claims. (Cl. 179—171)

Figure 1:
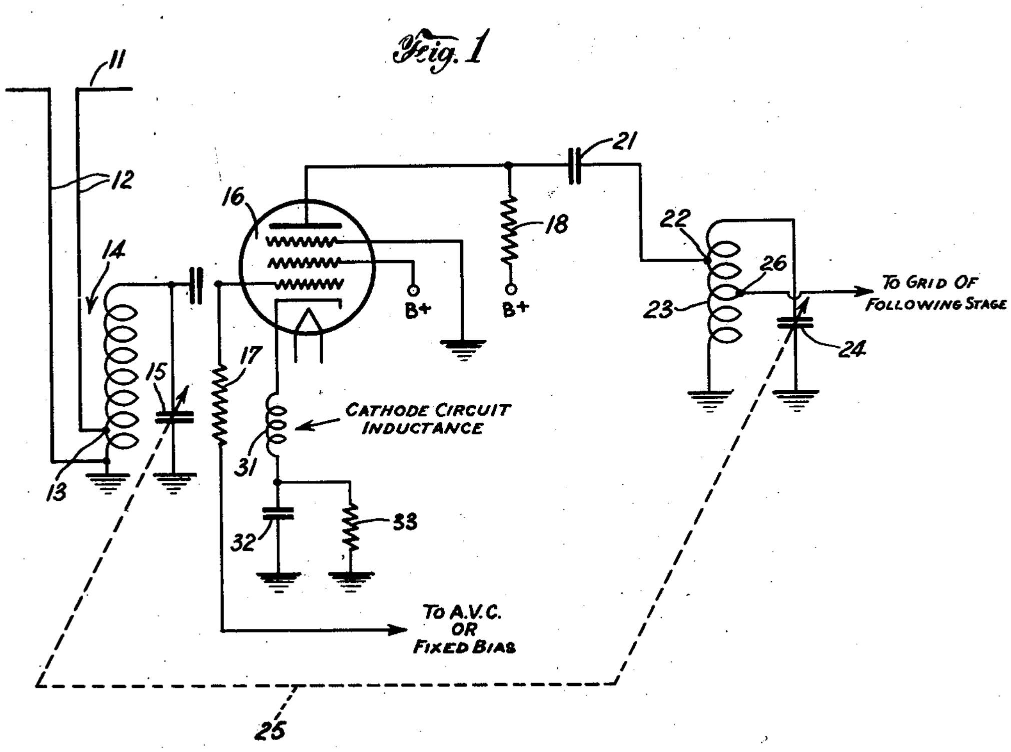

This invention relates in general to the art of radio frequency signal amplifiers, and more particularly to high frequency amplifiers having comparatively high input resistance and adapted for operation in systems of high gain and selectivity.

The input resistance, that is, the control grid-to-cathode resistance of an electron tube amplifier may be defined as the ratio of the applied alternating grid-to-cathode signal voltage to the component of grid current in phase with this voltage. Such grid current is in part a result of the capacitive relation between the grid and other tube electrodes including the cathode. In ordinary low frequency applications, the input resistance of an electron tube amplifier is so high as to be negligible in its effect as a load upon the input signal source.

At high frequencies of operation, as for example, frequencies above 15 megacycles and extending through the present day commercial television and frequency modulation spectrum to 108 megacycles, the inter-electrode capacitances permit alternating grid current flow sufficiently large to reduce the effective input resistance to a value which seriously affects the amplifier driving circuit. As an example of such operation, consider a radio frequency amplifier having a tuned input circuit. As is well understood, the amplitude of the grid-to-cathode signal voltage and the selectivity of the input circuit, that is, its ability to discriminate against signals other than the resonant frequency, are functions of the Q of the tuned circuit.

As the tuned circuit is generally connected across the grid and cathode, the input resistance of the amplifier, as defined above, is a loss factor which limits the magnitude of Q independently of the low-loss characteristics of the tuned circuit components.

An analytical study of the factors influencing the input resistance of an electron tube circuit will be presented hereinbelow. In general, however, the factors which influence the input resistance of a pentode electron tube amplifier under negative grid operation are the transit time of electrons and the fact that the lead from the cathode electrode to the cathode pin on the base of the tube is common to the grid and the plate circuits of the tube.

The inherent inductance of this cathode lead has the electrical effect of causing the signal voltage which exists across the control grid-to-cathode capacity to differ from the signal voltage applied to the tube from the input source circuit by an amount which is substantially equal to the voltage drop across the lead inductance. In effect, the grid to cathode capacity is in series with the cathode lead inductance across the input circuit. The voltage drop across the lead inductance is appreciable since the cathode lead signal current causing the drop is the amplified plate current.

As a result of the voltage drop across the cathode lead inductance, the signal current flowing through the capacity between grid and cathode has a component in phase with the applied signal voltage. In view of the above definition of input resistance, it is thus evident that the cathode lead inductance is in effect responsible for adding a load to a signal source voltage to be amplified. As will be shown below, the components of input resistance caused by both transit time and cathode inductance are most serious at the high frequencies of operation.

There have heretofore been developed a number of circuit arrangements for effectively neutralizing the input resistance resulting from the combined effects of transit time and cathode lead inductance. In this connection, reference is made to the "Radio Engineers' Handbook" by Frederick E. Terman, published by the McGraw-Hill Book Company in 1943. On pages 472 and 473 of this reference, there are described and illustrated several tube circuits wherein the effects of input resistance have been eliminated. In one such system, a small inductance, generally in the form of a short piece of wire is connected in series with the inherent inductance of the cathode lead; that is, between the cathode connecting pin on the tube and ground. A capacitor is connected between grid and ground. The plate, screen grid and suppressor of the tube are returned to ground, while the grid signal source is returned to the junction of the added inductance and the cathode lead connecting pin. If the components are selected so that they satisfy a specified relation, the input resistance is substantially infinite.

There is, however, a fundamental disadvantage of the above-described neutralizing circuit; namely, that the grid return is to a point other than ground. In radio applications where the input signal source includes a tuned circuit comprising an inductance and variable condenser in parallel, there are numerous advantages realized in operating the variable condenser with a grounded rotor. Such operation immediately precludes use of the above mentioned series inductance system for neutralizing the input resistance.

Other prior neutralizing systems, as for example, the construction of special electron tubes having two seperate cathode leads (Terman, page 473) so that the voltage developed in the cathode lead by the plate current does not appear in the grid circuit, have the same limitation as the series inductance system when used with variable condensers having a grounded rotor.

Accordingly, the present invention contemplates and has as a primary object the provision of a radio frequency amplifier of simplified overall construction having an extremely high input resistance. The principles of the present invention are applicable to substantially all high frequency amplifier systems, and in particular may be employed to neutralize input resistance in amplifiers having a common ground point for the input and output circuits thereof.

In brief, the present invention provides for the neutralization of the cathode lead inductance of an amplifier by capacitive means within the tube cathode circuit. It will be shown that by making the cathode circuit capacitive in effect, at the operating frequency, the overall input resistance of the tube is increased and, if desired, may be actually made negative. In one embodiment of this invention, the cathode circuit is made capacitive by series resonating the inherent inductance of the cathode circuit at a frequency above the operating frequency band.

It is therefore another object of the present invention to provide a tuned radio frequency amplifier wherein the input resistance is so high as to have negligible effect upon the Q of the tuned components.

A further object of the present invention is to provide a high frequency amplifier utilizing an electron tube cathode circuit which is capacitive at the operating frequency.

Another object of this invention is to provide a radio frequency amplifier wherein the inherent cathode lead inductance has been neutralized by a predetermined capacitor.

Still another object of the present invention is to provide a high frequency amplifier having tuned input and output circuits and which operates at maximum overall gain with minimum input circuit loading.

A still further object of the present invention is to provide a high frequency tuned amplifier particularly suited to operation above 15 megacycles and through a spectrum including a frequency above 108 megacycles, the latter frequency being the upper limit of present day commercial television and frequency modulation channels.

Figure 2:
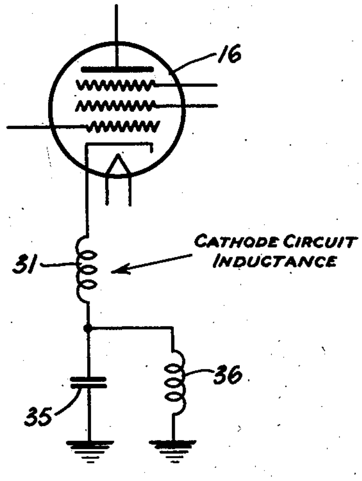

These and other objects of the present invention will now become apparent from the following detailed specification when taken in connection with the accompanying drawings in which:

Figure 1 is a schematic circuit diagram of a radio frequency amplifier incorporating the novel features of the present invention; and Figure 2 is a schematic circuit diagram of a modified cathode circuit useful in certain application of the amplifier of Figure 1.

As previously mentioned, the input resistance of a pentode electron tube may be regarded as the sum of the resistances caused by two factors; namely, the electron transit time within the tube from the cathode to the grid plane, and the inductance inherent in the cathode circuit of the tube. With reference again to Terman's "Radio Engineers' Handbook" cited above, and more particularly to pages 471 and 472 thereof, it is shown that the component of input resistance resulting from the finite interelectrode transit time (which resistance is herein designated as $R_1$) may be stated approximately by:

$$R_1=\frac{1}{Kg_m f^2\tau^2} \qquad (1)$$

wherein:

$g_m$ is the transconductance of the tube
$f$ is the frequency of amplifier operation
$\tau$ is the time required for an electron to travel from the cathode to the grid plane
K is a constant determined by the grid and plate votages and by the ratio of transit times from cathode to grid plane and grid plane to anode.

The input resistance factor $R_1$ caused by transit time phenomena is thus fixed by operating voltages, frequency, and tube geometry.

The input resistance component which results from the inductance of the cathode lead (which resistance is herein designated as $R_2$) is shown by the Terman reference to be approximately:

$$R_2=\frac{1}{\omega^2 g_m L_K C_{gk}} \qquad (2)$$

wherein:

$\omega=2\pi$ (frequency)
$g_m$ is the tube transconductance
$L_K$ is the inherent inductance associated with the cathode lead of the tube
$C_{gk}$ is the grid-to-cathode capacity of the tube.

The relation given by Equation 2 has been derived on the assumption that the reactance of the lead inductance $L_K$ is small compared with the grid-cathode capacity $C_{gk}$.

It will be noted that the two components of input resistance have the same type of variation with respect to frequency and transconductance. In ordinary type pentode tubes, these effects are of the same order of magnitude. With the quantity $f^2$ a factor in the denominator of each of these terms, it is evident that the input resistance decreases as a rapid function of frequency.

With the foregoing relationships in view, reference is now made to the drawings, and particularly Figure 1 thereof, for an illustration of an amplifier circuit which embodies the principles of the present invention. In this figure, there is shown a radio frequency amplifier which is successfully applicable to frequency modulation, television, and the like signal amplification. In this example, the signal source comprises a dipole receiving antenna 11 coupled by a transmission line 12 between ground and a tap 13 on an antenna auto-transformer coil 14. Coil 14 is resonated at the desired signal frequency by a parallel variable condenser 15, the rotor plates of which are grounded. The coil 14 and condenser 15 thus comprise the receiver input tuned circuit, which as illustrated is coupled to the control grid of a pentode electron tube 16. The control grid of tube 16 is also connected through high resistance 17 to the automatic volume control (AVC) or fixed bias source, as the case may be, of the receiver shown. The exact biasing means are not illustrated and are conventional.

The pentode 16 is for the most part conventionally connected, that is, the screen grid is connected directly to a positive source, B+, and the suppressor grid is grounded. The tube plate is energized from the positive source B+ through a suitable plate loading resistor 18, and the output signal is coupled through blocking capacitor 21 to a tap 22 on coil 23. Coil 23 is essentially a transformer as input coil 14, and is a component of a parallel resonant circuit tuned by variable condenser 24. Variable condenser 24 is operated with a grounded rotor and is mechanically ganged to the input tuning condenser 15; the mechanical connection being represented by the broken line 25. As the rotors of both condensers 15 and 24 are grounded, it is clear that both input and output circuits of the amplifier tube 16 have a common ground point. The output signal of the tuned circuit comprising coil 23 and condenser 24 is taken from a suitable tap 26 on coil 23 and applied to the following stage of the receiver. The taps on coils 14 and 23 are chosen so that proper impedance relationships are established.

The cathode circuit of tube 16 is shown to include an inductance 31, which it is emphasized, is not a physical external inductor; rather it is representative of the inherent and irreducible cathode circuit inductance resulting in part from the lead within the tube 16 connecting the cathode electrode and the tube connecting pin, and in part from the inductance added as a result of tube wiring and the like. Inductance 31 in the cathode circuit is simply a convenient manner of representing all inductance effects of the tube cathode circuit. In commercially available tubes having indirectly heated cathodes, inductance 31 has been found to be of the order of 0.01 to 0.02 microhenry. At 100 megacycles, such inductance is equivalent to a reactance between 6 and 12 ohms.

In accordance with my invention, a small capacitor 32 is added in series in the cathode circuit of tube 16 in Figure 1, and is shunted by a small resistor 33 to provide a continuous direct current circuit for the tube. Thus, capacitor 32 and its shunting resistor 33 are in series between the cathode inductance 31 and ground.

With reference to Equation 2 above, for the value of the input resistance due to cathode lead inductance, it may be seen that the factor $\omega L_K$ in the denominator is, for the circuit of Figure 1, the effective reactance of the entire cathode circuit and that the relation for this resistance must be modified to include the capacitor 32. Thus, re-writing Equation 2 and considering the cathode circuit reactance:

$$R_2=\frac{1}{\omega g_m\left(\omega L_K-\frac{1}{\omega C_{32}}C_{gk}\right)} \quad (3)$$

wherein $C_{32}$ is the capacitance of capacitor 32. For a rigorous analysis the reactance term of Equation 3 should include the capacitance between heater and cathode together with the heater inductance in series therewith to ground. However, as this capacitance is in large measure a distributed quantity its evaluation is difficult and for purposes of simplicity has been neglected in the approximate equation given herewith.

Examination of the parenthetical term in the denominator of Equation 3 shows that the input resistance $R_2$ of the tube 16 will be infinite when the capacitance $C_{32}$ is chosen so that it is series resonant with the cathode inductance 31 at the operating frequency, that is, when $$\omega L_K=\frac{1}{\omega C_{32}} \quad (4)$$

If capacitor 32 is somewhat larger than required to establish resonance, the factor $R_2$ of the total input resistance $$\left(\frac{R_1R_2}{R_1+R_2}\right)$$

will be positive and of high value. If on the other hand, capacitor 32 is smaller than that required for resonance at the operating frequency, $R_2$ will be high and negative. If $R_2$ is negative and larger than $R_1$ the total input resistance will be negative. Negative input resistance in this case means that energy at signal frequency is fed back into the grid circuit from the plate supply.

The cathode circuit of tube 16 may be made capacitive for negative input resistance by simply selecting capacitor 32 so that it series resonates inductance 31 at a frequency above the operating frequency band of the amplifier. As an example of magnitudes encountered in one amplifier using the present invention as shown in Figure 1, cathode capacitor 32 was 36 μμf., and resistor 33 was 150 ohms and the operating frequency band 88 to 108 megacycles.

It is emphasized at this point that the resistor 33 is not intended to provide cathode bias as in the more conventional usage (although it will inevitably contribute to the total bias); rather it is employed to provide a direct current path around capacitor 32. Similarly, capacitor 32 differs very substantially, both in function and magnitude, from the usual R.-F. by-pass capacitor customarily shunted across the usual cathode bias resistor. An R.-F. by-pass capacitor as usually employed in combination with a conventional bias resistor (such as the 150 ohm resistor, cited above) would have a capacity of 0.01 to 0.05 μf., that is, between 10,000 and 50,000 μμf., or roughly about 1000 times greater than the capacitor 32 in the above example.

In general, in the present invention, the reactance of the capacitor 32 at the operating frequency is not greater than the ohmic value of shunting resistor 33 and not less than one tenth of this ohmic value.

A cathode bias by-pass condenser would not therefore satisfy the aforementioned resonance requirements for neutralization of the input resistance of tube 16. In the circuit of Figure 1, grid bias is obtained through resistor 17 from a fixed bias voltage supply (not shown) or an AVC bias sytem (not shown). The circuit of the amplifier is not dependent upon resistor 33 for a bias potential.

The actual value of capacitor 32 is a function of the frequency band covered by the amplifier. As a general rule, capacitor 32 will be of the order of 15 to 75 micromicrofarads, which at 100 megacycles covers a reactance range greater than that of the cathode inductance 31 as mentioned above. The net reactance of the cathode to ground circuit is thus capacitive.

An examination of Equation 3 will indicate that as modified for consideration of capacitor 32, $R_2$ is no longer an inverse function of the frequency squared, as in $R_1$ in Equation 1. Accordingly neutralization of the input resistance is not exact as the frequency is varied. Over a narrow band of frequencies, however, as in the example cited above, 88 to 108 megacycles, such neutralization measurably improves amplifier operation, if the capacitor 32 is chosen to resonate the cathode circuit above this band.

Although resistor 33 of Figure 1 is not intended as a bias source, there is, as has been indicated above, an inevitable direct current drop across its terminals. If zero cathode bias operation is desirable, the cathode circuit arrangement of tube 16 shown in Figure 2 may be employed. It will be understood that Figure 2 is only illustrative of a modified cathode circuit, and that as an operating system, tube 16 of Figure 2 is connected as the correspondingly designated tube in Figure 1.

As shown in Figure 2, the cathode inductance 31 of tube 16 is resonated by a small capacitor 35 connected to ground and which is shunted preferably by a low Q inductance or choke coil 36. For successful operation in accordance with the above principles, the values of the choke 36 and capacitor 35 are chosen so that the parallel combination is capacitive over the frequency band of operation.

Further, the capacitive effect of the combination of choke 36 and capacitor 35 is such that the cathode inductance is resonated above the operating frequency band. As the D. C. resistance of choke 36 is low, the direct current drop across it is negligible. The sole tube bias is the bias potential applied to the control grid, as in Figure 1.

In the utilization of the present invention as shown in Figures 1 and 2, the input resistance of the tube is increased or made negative with the result that the Q of the tuned circuit comprising coil 14 and variable condenser 15 (Figure 1) is increased improving the tuning circuit selectivity and effectively applying a higher signal voltage to the tube control grid. As a result of the increased input resistance obtained by the present invention, it becomes practicable to realize a higher voltage step-up in the input transformer 14 between the antenna 11 and grid. Such step-up is accomplished simply by connecting the ungrounded side of transmission line 12 to a tap 13 which is nearer ground than would otherwise be usable. Such connection may be employed to secure an increased antenna gain by a factor of two or three, and has the further advantage of improving the image signal ratio of the amplifier input.

Clearly, the principles herein described and illustrated may be subject to various other applications. It is thus preferred that the spirit and scope of this invention be defined solely by the appended claims.

I claim:

1. A high frequency amplifier for amplifying signals comprising a circuit tunable over a predetermined frequency band, said tunable circuit comprising a vacuum tube having at least anode, cathode and control grid electrodes, a source of high frequency signal energy having a pair of terminals, said control grid being connected to one of said terminals and said cathode being connected to the other of said terminals by way of a cathode circuit, a load having a pair of terminals, said anode being connected to one of said load terminals and said cathode being connected to the other of said load terminals by way of said cathode circuit, said cathode circuit comprising inductive reactive components and a capacitor connected in series with at least a portion of said components, said capacitor and said components being so proportioned as to produce series resonance between said capacitor and said components at a frequency above the frequency at which said tunable circuit is tuned.

2. A high frequency amplifier comprising a circuit tunable over a frequency band from 88 to 108 megacycles, said tunable circuit comprising a vacuum tube having at least anode, cathode and control grid electrodes, a signal input circuit including the grid-to-cathode circuit of said tube, a signal output circuit including the anode-to-cathode circuit of said tube, the cathode circuit of said tube being common to both said input and output circuits, said cathode circuit comprising inductive reactive components, and capacitive reactive means connected in series with at least some of said reactive components to produce series resonance in said cathode circuit at a frequency above said frequency band.

3. A high frequency amplifier operative over a predetermined frequency band and comprising a vacuum tube having at least anode, cathode and control grid electrodes, a source of high frequency signals having a pair of output terminals, one of said terminals being connected to said grid and the other of said terminals being connected to said cathode by way of a cathode circuit, a load impedance having a pair of input terminals, one of said terminals being connected to said anode and the other of said terminals being connected to said cathode by way of said cathode circuit, said cathode circuit thereby being common to both grid and anode circuits of said tube, said cathode circuit comprising inherent impedance having an excessive inductive series component and means for neutralizing said inductive series component, said means comprising a capacitor connected in said cathode circuit in series with said inductive component and arranged to resonate with said inductive component at a frequency above said frequency band.

4. A high frequency amplifier comprising a circuit tunable over a predetermined frequency band, said tunable circuit comprising a vacuum tube having at least anode, cathode and control grid electrodes, a grid-to-cathode input circuit, an anode-to-cathode output circuit, the cathode portion of said input and output circuits being common to both, said cathode portion having equivalent series inductance, and having equivalent series capacitance such as to resonate said cathode portion at a frequency above said frequency band.

5. Means for increasing the input resistance of a high frequency vacuum tube amplifier having a cathode circuit common to its input and output circuit, said cathode circuit having excessive equivalent series inductance, said means comprising a capacitor connected in said cathode circuit, said capacitor having a value such that the equivalent series capacitive reactance of said cathode circuit including said capacitor exceeds said equivalent series inductive reactance.

6. Means for increasing the input resistance of a high frequency vacuum tube amplifier having a cathode circuit common to its input and output circuit, said cathode circuit having excessive equivalent series inductance, said means comprising a capacitor connected in said cathode circuit, said capacitor having a value such that the equivalent series capacitance of said cathode circuit including said capacitor exceeds said equivalent series inductance over the operating range of said amplifier and resonates therewith at a frequency above said range, and a radio frequency choke shunting said capacitor.

7. Means for increasing the input resistance of a high frequency vacuum tube amplifier having a cathode circuit common to its input and output circuit, said cathode circuit having excessive equivalent series inductance, said means comprising a capacitor connected in said cathode circuit, said capacitor having a value such that the equivalent series capacitance of said cathode circuit including said capacitor exceeds said equivalent series industance over the operating range of said amplifier and resonates therewith at a frequency above said range, and a direct current conductive means shunting said capacitor and having a low impedance for direct current and signals of low frequency and having a high impedance for signals of high frequency.

MILTON L. THOMPSON.

REFERENCES CITED

The following references are of record in the file of this patent:

UNITED STATES PATENTS

| Number | Name | Date |
|---|---|---|
| 2,093,094 | Peterson | Sept. 14, 1937 |
| 2,256,293 | Salzberg | Sept. 16, 1941 |
| 2,261,203 | Albright | Nov. 4, 1941 |
| 2,293,262 | Koch | Aug. 18, 1942 |
| 2,271,519 | Wolf | Feb. 3, 1942 |
| 2,351,934 | Kramolin | June 20, 1944 |
| 2,373,184 | Harold | Apr. 10, 1945 |